United States Patent
Pfeifer et al.

(10) Patent No.: US 11,675,098 B1
(45) Date of Patent: Jun. 13, 2023

(54) SYSTEMS AND METHODS FOR IN-SITU CALIBRATION OF SCINTILLATION SPECTROMETER

(71) Applicant: National Technology & Engineering Solutions of Sandia, LLC, Albuquerque, NM (US)

(72) Inventors: Kent B. Pfeifer, Los Lunas, NM (US); Loren E. Riblett, Jr., Edgewood, NM (US); Ben Maestas, Albuquerque, NM (US); Daniel Thomas Holslin, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 39 days.

(21) Appl. No.: 17/518,166

(22) Filed: Nov. 3, 2021

(51) Int. Cl.
*G01T 7/00* (2006.01)
*G01T 1/208* (2006.01)
*G01T 1/202* (2006.01)
*G01T 1/20* (2006.01)

(52) U.S. Cl.
CPC ............ *G01T 7/005* (2013.01); *G01T 1/2002* (2013.01); *G01T 1/208* (2013.01); *G01T 1/2023* (2013.01)

(58) Field of Classification Search
CPC ..... G01T 7/005; G01T 1/2002; G01T 1/2023; G01T 1/208
See application file for complete search history.

(56) References Cited

U.S. PATENT DOCUMENTS

| 6,342,698 | B1 | 1/2002 | Stark |
| 7,005,646 | B1 | 2/2006 | Jordanov et al. |
| 7,049,598 | B1 | 5/2006 | Jordanov et al. |
| 2017/0276831 | A1* | 9/2017 | Galford ............... G01V 5/08 |
| 2018/0074215 | A1* | 3/2018 | Marsden .............. G01T 1/1647 |

OTHER PUBLICATIONS

"NAIS—3×3 NaI LED Temperature-Stabilized Scintillation Detector", Retrieved from: www.mirion.com, 2 pages.
"Sensor Kit Based NaI(TI) Performance Stabilization", Retrieved from: www.crystals.saint-gobain.com, 2 Pages.

* cited by examiner

*Primary Examiner* — Hugh Maupin
(74) *Attorney, Agent, or Firm* — Mark A. Dodd

(57) ABSTRACT

A radiation spectrometer includes a scintillator, a photomultiplier, and one or more light-emitting diodes (LEDs). The scintillator receives radiation from the environment and emits light that is indicative of an energy of the radiation. The photomultiplier receives the light and outputs an electrical signal that is in turn indicative of the energy of the radiation. Spectral data can be generated based upon the electrical signal, wherein the spectral data indicates a number of radiation events in each of several energy bins. The one or more LEDs can emit LED light through the scintillator and toward the photomultiplier, wherein the LED light causes an LED peak in the spectral data that can be used to identify an absolute energy of radiation events in the spectral data.

19 Claims, 6 Drawing Sheets

US 11,675,098 B1

SYSTEMS AND METHODS FOR IN-SITU CALIBRATION OF SCINTILLATION SPECTROMETER

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

A gamma radiation spectrometer can be used to identify the presence of gamma radiation sources proximal to the spectrometer based upon scintillation caused by impingement of gamma rays on a crystal. In operation, such spectrometers are sensitive to changes in temperature and to aging of various components over time. Thus, while a gamma radiation spectrometer can provide information as to the relative energy of different impinging gamma rays, the absolute energies of these rays may be indeterminate from the scintillation alone due to variations in ambient temperature or drift due to aging. Conventionally, a gamma radiation spectrometer employs a radioactive calibration source, such as americium-241 ($^{241}$Am), to provide a source of radiation of known energy. The known energy of radiation emitted by the radioactive calibration source can be used to resolve absolute energy information from the scintillation of the crystal. However, radioactive sources like $^{241}$Am can require burdensome precautions be taken when they are moved from place to place. Thus, it may be impractical to transport a gamma radiation spectrometer that incorporates a radioactive calibration source to a place where it is needed.

SUMMARY

The following is a brief summary of subject matter that is described in greater detail herein. This summary is not intended to be limiting as to the scope of the claims.

Various technologies pertaining to a radiation spectrometer suitable for use as a gamma radiation spectrometer are described herein. In an exemplary embodiment, a radiation spectrometer includes a scintillator, a photomultiplier (e.g., a photomultiplier tube, a silicon photomultiplier, or the like), a light-emitting diode (LED), and a hardware logic component. The scintillator is configured to emit light responsive to radiation impinging on the scintillator. The photomultiplier is coupled to the scintillator such that the photomultiplier receives light that is emitted by the scintillator. The photomultiplier outputs an electrical signal that is indicative of the light received from the scintillator. The hardware logic component is configured to generate spectral data based upon the electrical signal output by the photomultiplier. The spectral data is indicative of radiation received at the scintillator. For example, the spectral data can comprise a histogram indicative of a number of counts or measurements for each of a plurality of energy bins. The hardware logic component can generate the spectral data based upon an amplitude of the electrical signal output by the photomultiplier over time.

The LED can be controlled (e.g., by the hardware logic component) to emit light toward the scintillator. The light emitted by the LED can cause an observable LED peak in the spectral data corresponding to a known energy level. Thus, an energy bin or bins associated with the LED peak can be identified as corresponding to the known energy level. The hardware logic component can be configured to assign energy levels to additional energy bins in the spectral data based upon the known energy level. Accordingly, the hardware logic component can be configured to output spectral data that is indicative of an absolute energy level of radiation impinging on the scintillator.

In some embodiments, the LED can be configured such that the scintillator is transparent to light emitted by the LED. Thus, light emitted by the LED can pass unimpeded through the scintillator and to the photomultiplier. The photomultiplier outputs an electrical signal indicative of the light emitted by the LED. Spectral data output by the hardware logic component can include an LED peak associated with the LED light as well as signals from the scintillation light stimulated by radiation present in the operational environment of the radiation spectrometer. By modulating the intensity of the light emitted by the LED, an amount of light emitted by the LED in a given period of time can be changed. As a result, a total energy of light that is received from the LED by the photomultiplier in the given period of time is changed by modulating the intensity of the LED. Accordingly, an expected energy of an LED peak in the spectral data associated with the LED light can be selected by selection of the intensity of the LED. A location of the LED peak caused by the LED in these embodiments can indicate performance of the photomultiplier independent of performance of the scintillator.

In various other embodiments, the LED can be configured to cause scintillation of the scintillator. For instance, the LED can be an LED that emits light in a wavelength that causes scintillation of the scintillator. When the LED emits such light, the light causes scintillation of the crystal, whereupon secondary light is emitted. The secondary light is received by the photomultiplier, and the photomultiplier outputs an electrical signal indicative of the secondary light. The hardware logic component outputs spectral data that includes an LED peak associated with the secondary light, wherein a position of the LED peak is dependent on an intensity of the light emitted by the LED and a scintillation characteristic of the scintillator. Accordingly, in embodiments wherein the LED causes scintillation of the scintillator, a location of the LED peak caused by the LED can indicate scintillation performance of the scintillator.

In still other embodiments, the LED can be configured to emit light in a wavelength that does not cause scintillation but that is at least partially absorbed by the scintillator (e.g., within a band of wavelengths that is emitted by scintillation of the scintillator). As some scintillators age, their optical absorption properties change. For example, scintillating crystals can absorb moisture from ambient air over time, and the absorbed moisture can alter optical absorption of the scintillator. When the LED emits light in a non-scintillating wavelength that is also partially absorbed by the scintillator, a non-absorbed portion of the emitted light is received by the photomultiplier. The electrical signal output by the photomultiplier is indicative of this non-absorbed light. A location of an LED peak associated with the non-absorbed light can be indicative of aging of the scintillator due to absorption of moisture.

It is to be understood that in some embodiments, a radiation spectrometer described herein can include multiple LEDs each configured to emit respective light toward a scintillator. By way of example, and not limitation, the radiation spectrometer can include a plurality of three LEDs wherein light emitted by a first LED causes scintillation of the scintillator, light emitted by a second LED is partially absorbed by the scintillator, and light emitted by a third LED passes through the scintillator without substantial absorption by the scintillator. In these embodiments, spectral data output by the radiation spectrometer can include respective LED peaks associated with light emitted by the first, second, and third LEDs. Positions of these LED peaks along an energy spectrum (e.g., their associated energy bins) can be indicative of distortions due to aging of the scintillator, variations in bias voltage of the photomultiplier, temperature variations in the operational environment of the radiation spectrometer, or other factors.

In contrast with conventional gamma radiation spectrometers that employ a radioactive calibration source, radiation spectrometers described herein can output spectral data indicating absolute energy of radiation that impinges on the spectrometer during a collection period without use of a radioactive calibration source. Radiation spectrometers described herein can be readily transported by air or other means consistent with existing environmental and safety regulations, since spectrometers described herein do not require radioactive calibration sources to function.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
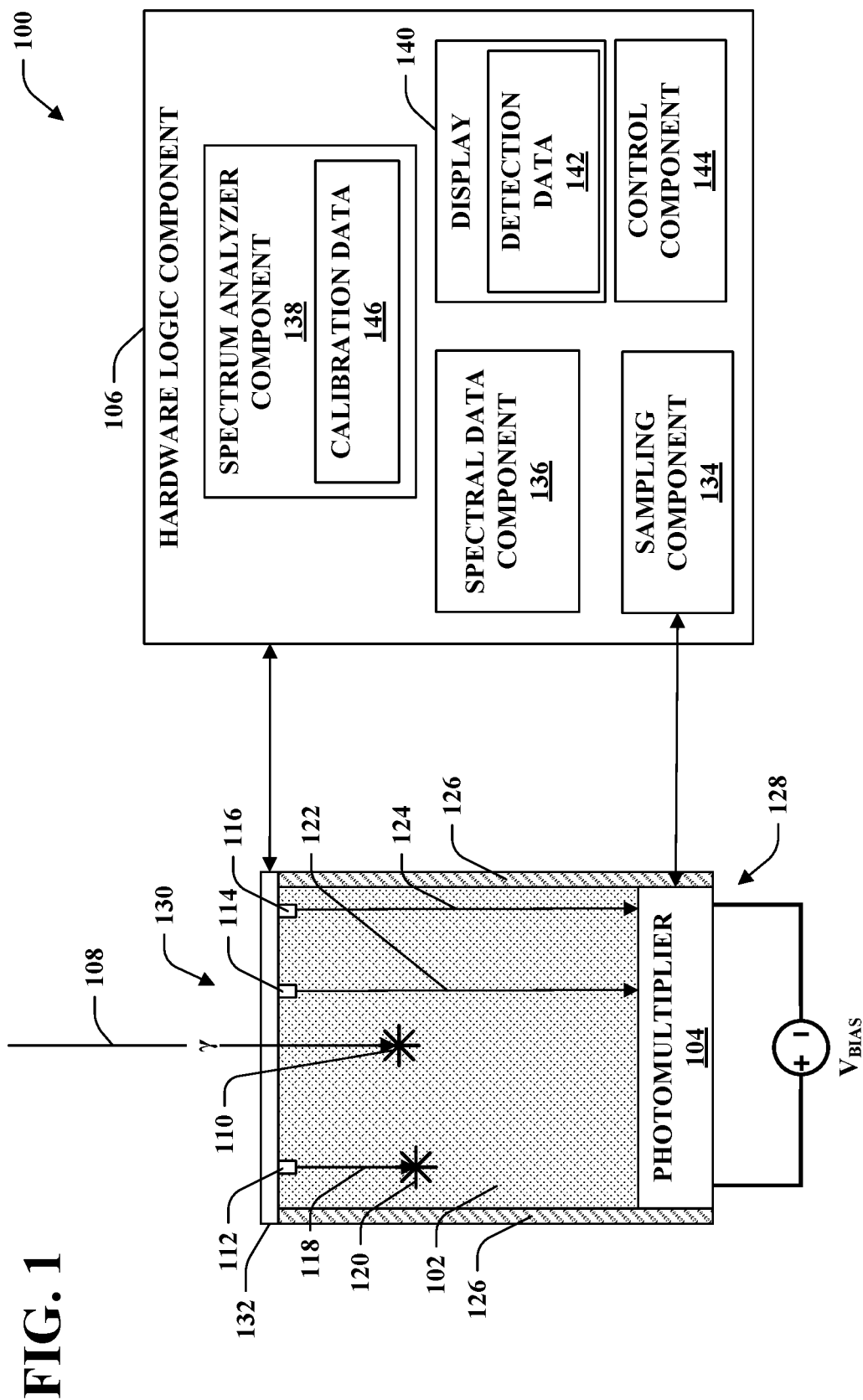
FIG. 1 is a diagram of an exemplary radiation spectrometer system.

Various technologies pertaining to a radiation spectrometer are now described with reference to the drawings, wherein like reference numerals are used to refer to like elements throughout. With greater specificity, methods and systems for calibration of a radiation spectrometer that does not include an on-board radioactive reference source are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary radiation spectrometer system 100 is illustrated. The system 100 includes a scintillator 102, a photomultiplier 104, and a hardware logic component 106. The scintillator 102 can be composed of any of various scintillation materials that are sensitive to a type of radiation that is desirably detected by the radiation spectrometer system 100. In an exemplary embodiment, the scintillator 102 can be a crystal scintillator (e.g., composed of cesium iodide). In various other embodiments, the scintillator 102 can be a plastic scintillator. It is to be understood that the scintillator 102 can comprise substantially any material that scintillates within the response band of the photomultiplier 104, when the scintillator 102 is irradiated by ionizing radiation. The photomultiplier 104 can be any of various photomultiplier devices that are configured to output an electrical signal that is indicative of an energy of light incident on the photomultiplier 104. By way of example, and not limitation, the photomultiplier 104 can be a photomultiplier tube (PMT) or a silicon photomultiplier (SiPM). The hardware logic component 106 can be any of various types of hardware logic component, such as a microcontroller, field-programmable gate array (FGPA) or application-specific integrated circuit (ASIC).

Briefly, the scintillator 102 receives radiation, such as a gamma ray 108, and emits light 110 responsive to the radiation impinging on the scintillator 102 when the radiation has an energy within a scintillation response band of the scintillator 102 (i.e., a range of energies sufficient to cause scintillation of the scintillator 102). The photomultiplier 104 receives light emitted by the scintillator 102 (e.g., all or a portion of the light 110) and outputs an electrical signal that is indicative of the received light. The hardware logic component 106 can be configured to sample the electrical signal output by the photomultiplier 104 and to generate spectral data based upon the electrical signal, wherein the spectral data is indicative of an energy of the radiation (e.g., the gamma ray 108) received by the scintillator 102.

Figure 2:
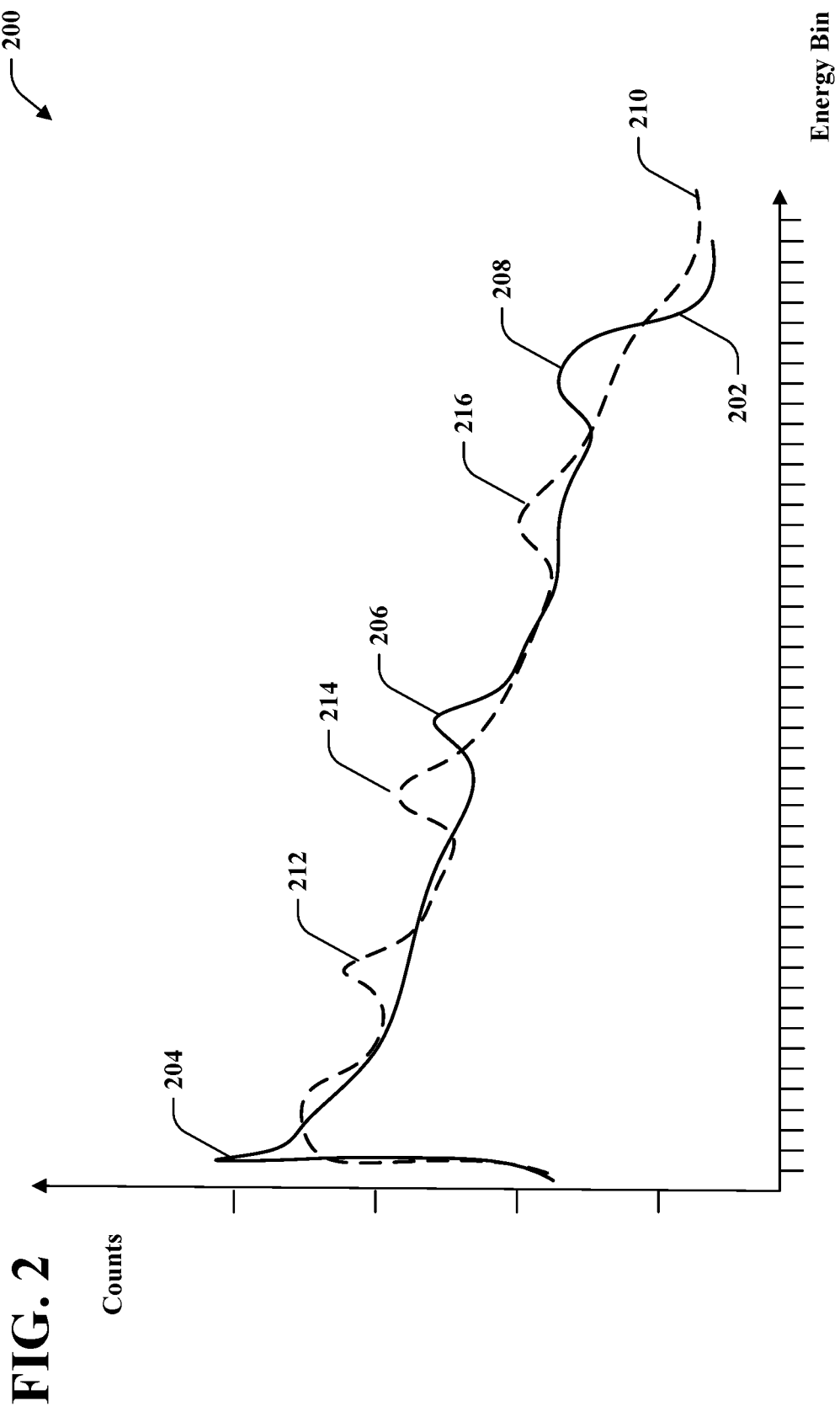
FIG. 2 is an energy spectrum diagram illustrating various spectral data.

For various reasons, the absolute energy of gamma radiation received at a radiation spectrometer may be indeterminate based solely upon an electrical signal output by a photomultiplier of the spectrometer. For example, the performance of the scintillator 102 can vary due to aging of the scintillator 102 or operational temperature of the scintillator 102, and therefore the light emitted by the scintillator 102 responsive to a given radiation event may not be consistent over time and in different environments. Thus, a reference radiation source has conventionally been used to provide a benchmark energy from which the absolute energy of other radiation events can be resolved. By way of example, and referring now to FIG. 2, an energy spectrum diagram 200 is illustrated, on which is shown a plot of exemplary spectral data 202 generated by a conventional gamma radiation spectrometer. The spectral data 202 comprises a histogram of a number of counts, plotted along the y-axis, for each of a plurality of energy bins, plotted along the x-axis in order of increasing energy. In this context, a "count" is a period of time over which the integral of the electrical signal output by the photomultiplier lies within a range associated with an energy bin. The spectral data 202 is generally defined by an initial rapid increase in the number of counts per energy bin, followed by a steady decline in the number of counts as the energy of the bins increases. The spectral data 202 includes a first peak 204 that is associated with a radioactive reference source comprising $^{241}$Am, a second peak 206 that is associated with $^{40}$K, and a third peak 208 that is associated with $^{232}$Th and $^{208}$Tl, the latter three isotopes being commonly found in construction concrete. Apart from the peaks 204, 206, 208 associated with radiation emitted by the isotopes $^{241}$Am, $^{40}$K, $^{232}$Th and $^{208}$Tl, respectively, the spectral data 202 is representative of background radiation in an ambient environment of the gamma radiation spectrometer.

The radiation spectrometer system 100 is configured to generate spectral data from which the absolute energy of impinging radiation (e.g., gamma radiation) can be determined, without requiring a radioactive reference source. The radiation spectrometer system 100 further includes a plurality of LEDs 112, 114, 116 that are each configured to emit, toward the scintillator 102, light that causes an observable peak in spectral data output by the hardware logic component 106, referred to herein as an LED peak. As will be described in greater detail below, a first LED 112 is configured to emit LED light 118 that causes scintillation of the scintillator 102, whereupon the scintillator 102 emits secondary scintillation light 120. A second LED 114 is configured to emit LED light 122 that is partially absorbed by the scintillator 102 prior to the LED light 122 impinging on the photomultiplier 104. A third LED 116 is configured to emit LED light 124 to which the scintillator 102 is substantially transparent, such that the LED light 124 propagates substantially unimpeded to the photomultiplier 104. The LED lights 122, 124 emitted by the second LED 114 and the third LED 116 and the scintillation light 120 stimulated by the first LED 112 are received by the photomultiplier 104. As each of the lights 110, 120, 122, 124 are received at the photomultiplier 104, the photomultiplier 104 outputs an electrical signal indicative of the energy of the lights 110, 120, 122, 124.

In exemplary embodiments, the radiation spectrometer system 100 includes an isolation chamber 126 within which the scintillator 102 and the photomultiplier 104 are positioned. The isolation chamber 126 is configured to prevent stray light from impinging on the photomultiplier 104 and thereby affecting the spectral data generated by the hardware logic component 106. The isolation chamber 126 can include a first end 128 and a second end 130. The photomultiplier 104 can be positioned at the first end 128 of the isolation chamber 126. A circuit board 132 can be positioned at the second end 130 of the isolation chamber 126 opposite the photomultiplier 104, wherein the LEDs 112, 114, 116 are positioned on the circuit board 132 and aimed toward the photomultiplier 104. The circuit board 132 can serve as a cap at the second end 130 of the isolation chamber 126, thereby preventing stray light from entering the isolation chamber 126 at the second end 130. Due to the penetrating nature of gamma radiation, the gamma ray 108 is able to penetrate the circuit board 132 and cause scintillation of the scintillator 102. In exemplary embodiments, the hardware logic component 106 can be included on the circuit board 132, however, it is to be understood that in other embodiments the hardware logic component 106 can be separate from the circuit board 132. In these embodiments, the hardware logic component 106 can be coupled to the circuit board 132 by way of an electrical interface that facilitates control of the LEDs 112, 114, 116 by the hardware logic component 106.

Exemplary operations of the system 100 are described in greater detail below. The radiation spectrometer system 100 can be operated in a detection mode or a calibration mode. The system 100 can be operated in the detection mode when radiation, such as the gamma ray 108, is desirably detected. In the detection mode, the LEDs 112, 114, 116 can be kept in an "off" state to facilitate detection of gamma radiation throughout a range of energies to which the scintillator 102 is sensitive. When a gamma ray impinges on the scintillator 102, there is a chance that the gamma ray will interact with the scintillator 102 and cause the scintillator 102 to emit light. Thus, the gamma ray 108 passes through the second end 130 of the isolation chamber 126 and impinges on the scintillator 102, causing the light 110 to be emitted. A total energy of the light 110 is dependent upon the energy of the gamma ray 108 that caused the scintillation. Therefore, a total energy of the light 110 is indicative of the energy of the gamma ray 108.

The photomultiplier 104 receives the light 110 and outputs an electrical signal that is indicative of an energy of the light 110. Since the total energy of the light 110 is dependent upon the energy of the gamma ray 108, the electrical signal output by the photomultiplier 104 is indicative of the energy of the gamma ray 108. In embodiments wherein the photomultiplier 104 is a PMT, the photomultiplier 104 outputs an electrical current pulse responsive to receipt of the light 110. In these embodiments, a time-integral of the current output by the photomultiplier 104 is indicative of the energy of the incident gamma ray 108.

The hardware logic component 106 is configured to receive the electrical signal output by the photomultiplier 104 and to generate spectral data that indicates that the gamma ray 108 impinged on the scintillator 102 and further indicates an energy of the gamma ray 108. The hardware logic component 106 includes a sampling component 134 that is configured with appropriate circuitry to sample output of the photomultiplier 104. In a non-limiting example, the sampling component 134 can include an analog-to-digital converter (ADC) that is coupled to an output line of the photomultiplier 104 and configured to digitally sample a current or voltage output by the photomultiplier 104. In other exemplary embodiments, the sampling component 134 can include a charge amplifier circuit that is configured to receive a current output by the photomultiplier 104 and to output a voltage that is indicative of the total charge received over a period of time. In these embodiments, the sampling component 134 can include an ADC that is coupled to an output of the charge amplifier circuit and configured to output data indicative of the voltage output by the charge amplifier circuit.

The hardware logic component 106 includes a spectral data component 136 that is configured to generate spectral data based upon output of the photomultiplier 104, as sampled by the sampling component 134. The spectral data component 136 generates the spectral data based upon output of the photomultiplier 104 received over a data collection period. The data collection period comprises a plurality of shorter-duration count periods. Within a count period, the spectral data component 136 determines a total energy of radiation received by the spectrometer system 100. For example, in embodiments wherein the sampling component 134 digitally samples a current output by the photomultiplier 104, the spectral data component 136 can integrate the current over a count period based upon the digitally sampled values generated by the sampling component 134 to identify a total charge output by the photomultiplier 104 over the count period. In embodiments wherein the sampling component 134 includes a charge amplifier circuit, the output voltage of the charge amplifier circuit can be directly indicative of the total charge output by the photomultiplier 104 over the count period. Since the total charge output by the photomultiplier 104 in a period of time is indicative of a total energy of radiation that interacts with the scintillator 102, the spectral data component 136 can determine an energy bin associated with the charge output by the photomultiplier 104 in the count period. Responsive to determining that the energy bin is associated with the charge output by the photomultiplier 104 in the count period, the spectral data component 136 increments a count associated with the energy bin. The spectral data component 136 similarly identifies associated energy bins for each count period in the data collection period and increments counts corresponding to the energy bins accordingly. Hence, the spectral data component 136 generates a histogram that is indicative of a number of count periods over the data collection period for which the total energy of scintillation events lies within each of a plurality of energy bins.

In most operational environments of the radiation spectrometer system 100, background radiation is present and is represented in the spectral data. Depending upon the nature of the background radiation and the number and energy of gamma rays that interact with the scintillator 102, it may be difficult to manually distinguish peaks in the spectral data caused by the presence of radiation sources from a background level of radiation. Thus, the hardware logic component 106 can include a spectrum analyzer component 138 that is configured to analyze the spectral data generated by the spectral data component 136 and to identify peaks in the spectral data that are representative of the presence of a radiation source proximal to the system 100. The spectrum analyzer component 138 can be configured to identify these peaks based upon various analytical techniques, including neural network and deep learning-based approaches.

The spectrum analyzer component 138 can further be configured to identify an absolute energy, or range of energies, associated with each of the energy bins in spectral data generated by the spectral data component 136. In an exemplary embodiment, the spectrum analyzer component 138 can be configured with an initial correspondence between energy bins and absolute energies. The spectrum analyzer component 138 can further be configured to identify a radioactive species responsible for radiation represented by a peak in the spectral data. For example, the spectrum analyzer component 138 can be configured to identify a radioactive species corresponding to an absolute energy of a peak identified in the spectral data by the spectrum analyzer component 138. In various embodiments, the hardware logic component 106 can include a display 140. The spectrum analyzer component 138 can be configured to cause an indication of an identified radioactive species to be displayed on the display 140 as detection data 142. The spectrum analyzer component 138 can also be configured to cause a plot of the spectral data and any peaks identified therein to be displayed on the display 140 as the detection data 142.

Due to variations in performance of the scintillator 102 and/or photomultiplier 104 over time, variations in operating voltage, or due to changes in environmental conditions, an initial correspondence between energy bins and absolute energies may be inaccurate once the radiation spectrometer system 100 is taken to or operated in its operational environment. The radiation spectrometer system 100 can be operated in a calibration mode to reestablish accurate correspondence between the energy bins and absolute energies.

The hardware logic component 106 further includes a control component 144 that is configured to control operation of the LEDs 112, 114, 116. In the calibration mode of the radiation spectrometer system 100, the control component 144 controls the LEDs 112, 114, 116 to emit light through the scintillator 102 and toward the photomultiplier 104. The light emitted by the LEDs 112, 114, 116 causes LED peaks in spectral data generated by the spectral data component 136. For instance, the LED lights 122, 124 emitted by the second LED 114 and the third LED 116, respectively, can stimulate the photomultiplier 104 to output an electrical current that is indicative of energy of the lights 122, 124. Similarly, the LED light 118 emitted by the first LED 112 can stimulate the scintillator 102, causing the scintillator 102 to emit the scintillation light 120, which scintillation light 120 is incident on the photomultiplier 104 thereby causing the photomultiplier 104 to output an electrical current indicative of energy of the scintillation light 120. The electrical currents output by the photomultiplier 104 due to the lights 120, 122, 124 present as peaks in spectral data generated by the spectral data component 136. The peaks in the spectral data caused by the lights 120, 122, 124 are referred to herein as LED peaks.

For example, and referring once again to FIG. 2, the energy spectrum diagram 200 includes a plot of exemplary second spectral data 210, wherein the spectral data 210 includes LED peaks 212, 214, 216 caused by the lights 120, 122, 124 stimulated/emitted by the LEDs 112, 114, 116. Locations of the peaks 212-216 can be associated with predefined, known absolute energies. For instance, it can be known that a pulse of the LED light 124 emitted by the LED 116 with a first intensity and a first duration presents as an LED peak at a given absolute energy (e.g., at a same energy bin location as a gamma ray having the given absolute energy). Thus, energy bin locations of other potential peaks in the second spectral data 210 can be associated with absolute energies based upon the LED peaks 212-216 associated with the lights 120, 122, 124 stimulated/emitted by the LEDs 112, 114, 116.

Referring again to FIG. 1, the LED peaks in the spectral data caused by operation of the LEDs 112, 114, 116 can be employed by the spectrum analyzer component 138 to determine a correspondence between energy bins and absolute energies. In a non-limiting example, the spectrum analyzer component 138 can receive spectral data from the spectral data component 136. The spectrum analyzer component 138 can identify a first energy bin associated with a first LED peak in the spectral data and a second energy bin associated with a second LED peak in spectral data, wherein the first LED peak and the second LED peak are caused by two of the LEDs 112-116. The first LED peak and the second LED peak can therefore further be associated with known absolute energy levels. The spectrum analyzer component 138 can further identify a third energy bin associated with a third LED peak in the spectral data, wherein the third peak is caused by radiation, such as the gamma ray 108, impinging on the scintillator 102. In some embodiments, the third peak can be present in second spectral data that is generated by the spectral data component 136 and that does not include the first and second LED peaks. Whether the third peak is present in the spectral data that includes the first and second LED peaks, or in second spectral data that does not include the first and second LED peaks, the spectrum analyzer component 138 can be configured to determine an absolute energy associated with the energy bin of the third peak by interpolating between the known energy bin/energy pair of the first LED peak and the known energy bin/energy pair of the second LED peak.

Figure 3:
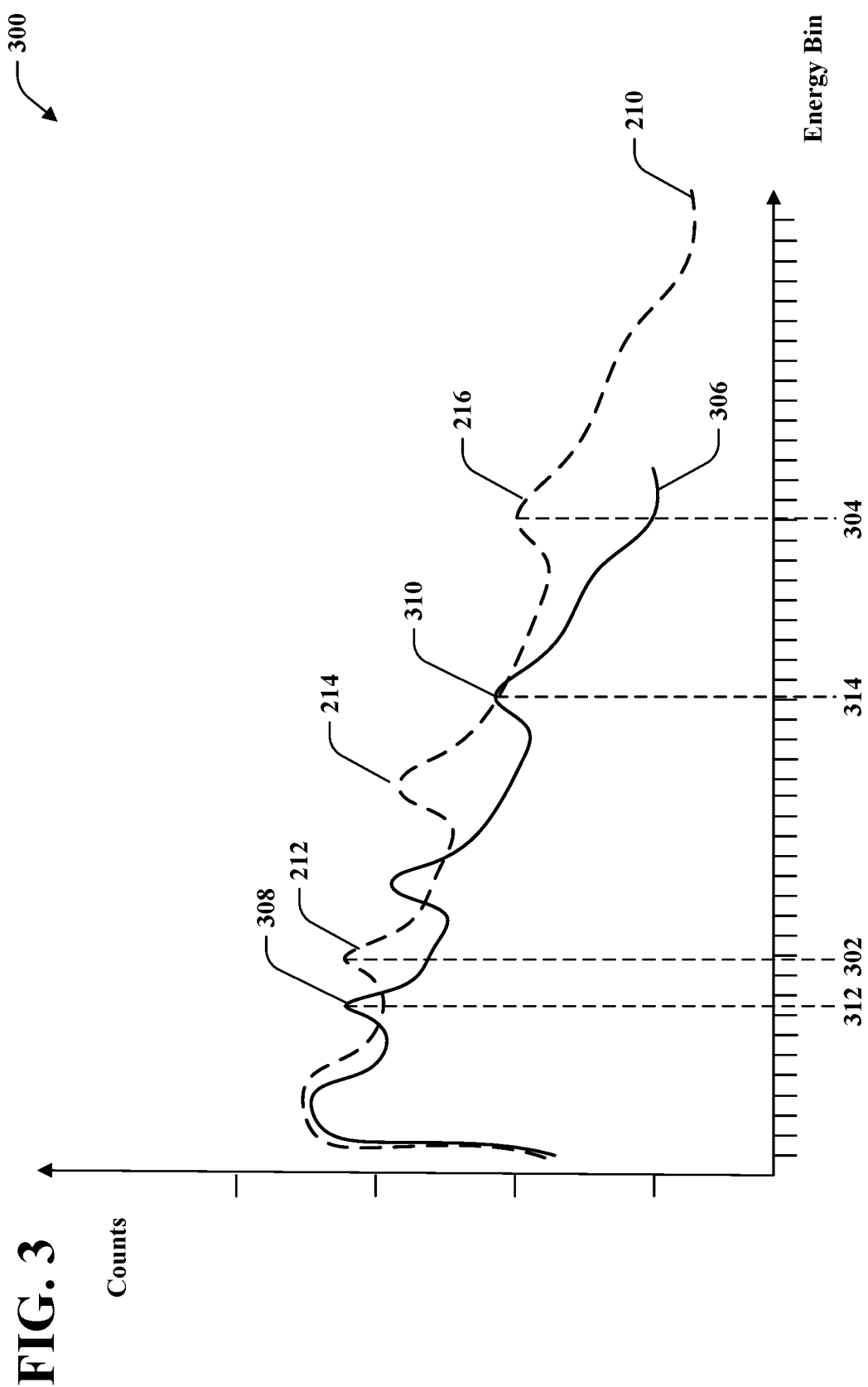
FIG. 3 is another energy spectrum diagram illustrating further spectral data.

In other embodiments, the control component 144 of the hardware logic device 106 can be configured to control a bias voltage $V_{BIAS}$ applied to the photomultiplier 104 based upon positions of LED peaks in spectral data caused by the LEDs 112, 114, 116. In general, all else being equal, changing the bias voltage applied to the photomultiplier 104 will stretch or compress the spectral data along the energy bin axis. For example, and referring now to FIG. 3, another energy spectrum diagram 300 is shown, wherein the diagram 300 includes the second spectral data 210. The radiation spectrometer system 100 can be initially calibrated such that when a first LED peak associated with light emitted by one of the LEDs 112, 114, 116, such as the LED peak 212 in the spectral data 210, is aligned with a first energy bin (e.g., a bin 302), and a second LED peak associated with light emitted by another one of the LEDs 112, 114, 116, such as the LED peak 216 in the spectral data 210, is simultaneously aligned with a second energy bin (e.g., a bin 304), there is a known correspondence between the energy bins and a range of energies. Subsequently, the system 100 can be recalibrated by causing the LEDs 112, 114, 116 to emit the same light associated with the first and second LED peaks and generating additional spectral data by way of the spectral data component 136. If the first LED peak and the second LED peak caused by the LEDs 112, 114, 116 remain aligned with the first energy bin and the second energy bin, respectively, the radiation spectrometer system 100 can be considered to remain appropriately calibrated.

However, if the LED peaks caused by the LEDs 112, 114, 116 do not remain aligned with the first and second energy bins, the control component 144 can change the bias voltage $V_{BIAS}$ to cause the spectral data to be shifted. For example, the energy spectrum diagram 300 shows additional spectral data 306 that includes a third LED peak 308 and a fourth LED peak 310, wherein the third LED peak 308 and the fourth LED peak 310 are caused by the same LEDs that caused the LED peaks 212, 216. The third LED peak 308 is aligned to a third energy bin 312 and the fourth LED peak 310 is aligned to a fourth energy bin 314. In an exemplary embodiment, the spectrum analyzer component 138 can include calibration data 146 that indicates that the LED peaks 212, 216 should be aligned to the bins 302, 304. The spectrum analyzer component 138 can be configured to identify that the LED peaks 308, 310 correspond to the LED peaks 212, 216 and are further not aligned to the bins 302, 304. The control component 144 can be configured to control the voltage $V_{BIAS}$ to cause the LED peaks 308, 310 to be aligned to the energy bins 302, 304. For example, since the spectral data 306 is "compressed" relative to the spectral data 210, the control component 144 can be configured to increase $V_{BIAS}$ in order to stretch the spectral data 306 along the energy bin axis in a direction of increasing energy.

Since each photon incident on the photomultiplier 104 stimulates the photomultiplier 104 to output additional electric current, an LED peak in spectral data resulting from light output by one of the LEDs 112, 114, 116 can be shifted to a different energy bin by changing the intensity of the light output by the LED. For example, the control component 144 can control the LED 116 to emit the LED light 124 with a first intensity. Spectral data generated by the spectral data component 136 includes a first LED peak that is representative of the LED light 124 and that corresponds to a first energy bin. The control component 144 can then control the LED 116 to emit the LED light 124 with a second intensity that is greater than the first intensity. The spectral data generated by the spectral data component 136 then includes a second LED peak that is representative of the LED light 124 and that corresponds to a second energy bin that is indicative of a higher energy than the first energy bin.

The control component 144 can further be configured to control a number of pulses of the LEDs 112, 114, 116 during a data collection period over which spectral data is generated by the spectral data component 136. By pulsing the LEDs 112, 114, 116 a greater number of times within the data collection period, a number of counts in the energy bins associated with the LED lights 118, 122, 124 emitted by the LEDs 112, 114, 116 can be increased, which can facilitate identification of the LED peaks caused by the LEDs 112, 114, 116.

The LEDs 112, 114, 116 can further be configured to facilitate diagnosis of performance degradation of various components of the radiation spectrometer system 100. For example, each of the LEDs 112, 114, 116 can be configured to emit LED light having a different wavelength or band of wavelengths, wherein the different wavelengths of light interact with components of the system 100 in different ways.

In one exemplary embodiment, the first LED 112 is configured to facilitate diagnosis of degradation or performance deviation of the scintillator 102. The first LED 112 is configured to emit LED light 118 that has a wavelength sufficient to cause scintillation of the scintillator 102. By way of example, and not limitation, the LED 112 can be configured to emit ultraviolet (UV) light that has a center wavelength of between 200 and 300 nanometers (e.g., 250 nanometers). Thus, the LED light 118 emitted by the LED 112 causes scintillation of the scintillator 102, which emits secondary scintillation light 120. An LED peak in the spectral data generated by the spectral data component 136 that is associated with the secondary scintillation light 120 can be indicative of a state of health of the scintillator 102 with respect to its scintillation performance. For instance, if the LED peak associated with the secondary scintillation light 120 has a lower number of counts than expected, or is positioned in a lower energy bin than expected, this can indicate that the scintillation performance of the scintillator 102 is degraded.

In another exemplary embodiment, the second LED 114 is configured to emit LED light in a wavelength band that at least partially overlaps with a wavelength band of light emitted by the scintillator 102 during scintillation of the scintillator 102. By way of example, and not limitation, in an embodiment wherein the scintillator 102 is a cesium iodide scintillator, the LED 114 can emit LED light in wavelengths between about 350 nanometers and about 600 nanometers. In a further example, the LED 114 can emit blue light in wavelengths centered about 470 nanometers. As indicated above, as some scintillators age, their optical absorption properties change. Some scintillators exhibit greater optical absorption of wavelengths emitted by the scintillator during scintillation as they age. By emitting LED light in a wavelength band that partially overlaps with a wavelength band of light emitted by the scintillator 102, the LED 114 can aid in the detection of aging of the scintillator 102. By way of example, if an LED peak associated with the LED light 122 emitted by the LED 114 is in a lower-than-expected energy bin or has a lower number of counts than expected, this can indicate that the optical absorption properties of the scintillator 102 have changed due to aging. This can in turn affect the apparent energies of radiation that is incident on the scintillator 102 by changing the amount of light received by the photomultiplier 104 for a given radiation event.

In further exemplary embodiments, the third LED 116 can be configured to emit the LED light 124 in a wavelength band with respect to which the scintillator 102 is substantially transparent. For example, the third LED 116 can emit red light in wavelengths greater than or equal to about 600 nanometers (e.g., centered about a wavelength of 640 nanometers). By virtue of transparency of the scintillator 102 to the LED light 124, the third LED 116 can be used to test functionality of the photomultiplier 104 without substantial effect of the scintillator 102.

From the foregoing, it is to be understood that the LEDs 112, 114, 116 can be employed to check operability of various components of the radiation spectrometer system 100 independently. For example, deviations of an LED peak associated with the third LED 116 from an expected energy bin or number of counts can be indicative of faulty operation of the photomultiplier 104 and/or the sampling component 134. In another example, deviations of LED peaks associated with the first and second LEDs 112, 114 from expected energy bins while an LED peak associated with the third LED 116 is aligned with an expected energy bin can indicate aging or performance degradation of the scintillator 102.

Figure 4:
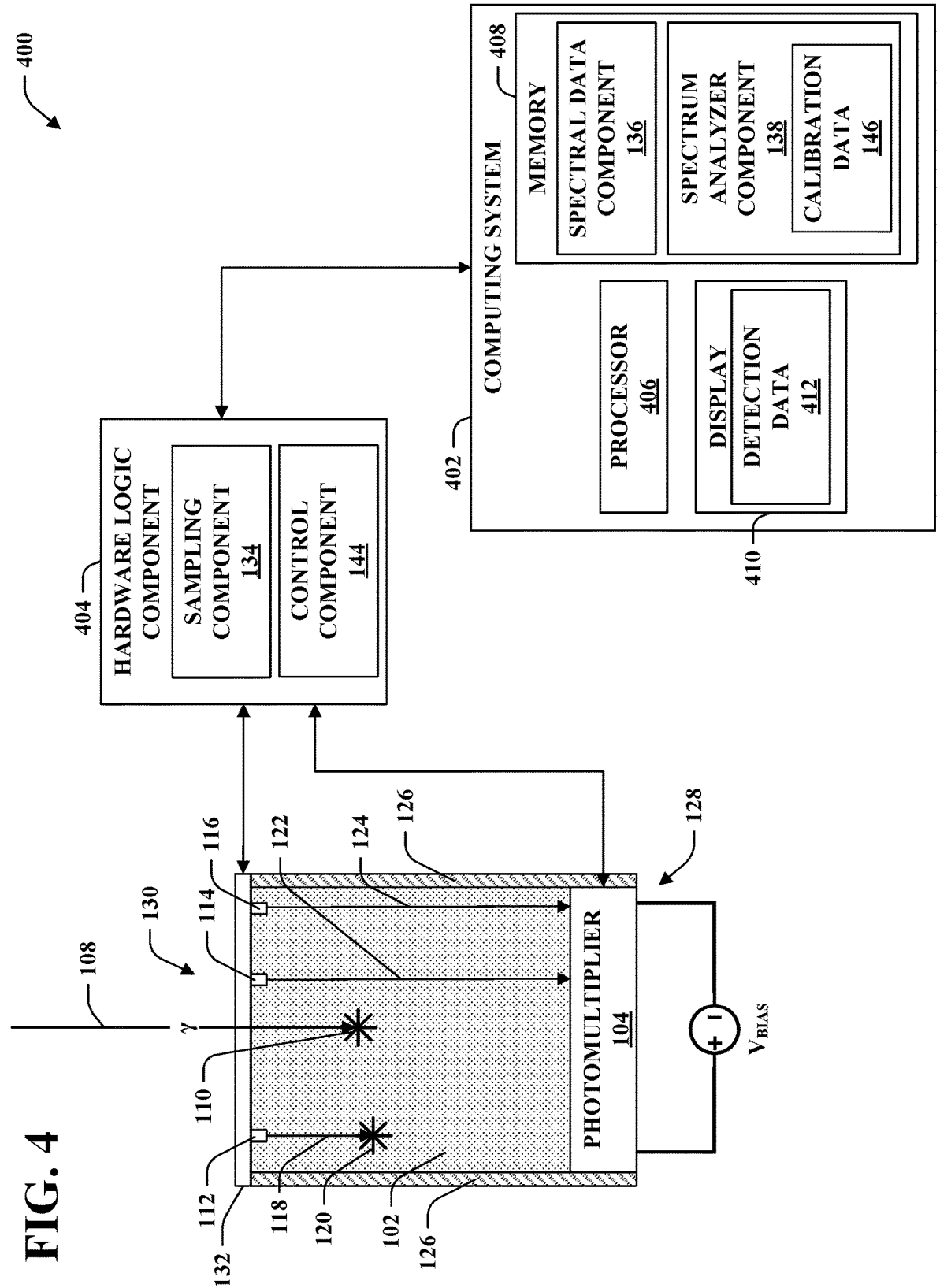
FIG. 4 is a diagram of another exemplary radiation spectrometer system.

Referring now to FIG. 4, another exemplary radiation spectrometer system 400 is illustrated, wherein the system 400 includes a computing system 402 that is configured to generate and analyze spectral data based upon electrical signals output by the photomultiplier 104. The system 400 includes the scintillator 102, the photomultiplier 104, and the LEDs 112, 114, 116 configured in the same manner as described above with respect to FIG. 1. The system 400 further includes a hardware logic component 404, which hardware logic component 404 includes the sampling component 134 and the control component 144. The sampling component 134 is configured to generate digital values that are indicative of electrical signals generated by the photomultiplier 104, as described above. The hardware logic component 404 outputs the digital values generated by its sampling component 134 and the computing system 402 generates and analyzes spectral data that is based upon the digital values.

The computing system 402 includes a processor 406 and memory 408 that stores instructions that, when executed by the processor 406, cause the processor 406 to perform various acts. The computing system 402 further includes a display 410 on which can be displayed detection data 412, which may be or include any of various data included in the detection data 142. The memory 408 can include the spectral data component 136 and the spectrum analyzer component 138, which components 136, 138 are configured to perform substantially similar functionality to that described above with respect to FIG. 1.

The computing system 402 can facilitate user interaction with and control of the radiation spectrometer system 400, and can further be configured to perform spectral analysis that may be more easily performed by a distinct computing system than by the hardware logic component 404. For example, in embodiments wherein analysis of spectral data includes neural network-based or other deep learning techniques, such techniques may be more readily performed by the computing system 402 than by the hardware logic component 404. In further examples, the computing system 402 can receive user input pertaining to operational parameters of the photomultiplier 104 (e.g., a value of $V_{BIAS}$) or the LEDs 112, 114, 116, such as intensities of the LEDs 112, 114, 116, a number of pulses of the LEDs 112, 114, 116 within a data collection period, etc. The computing system 402 can transmit instructions to the hardware logic component 404 that cause the control component 144 to operate the LEDs 112, 114, 116 and/or the photomultiplier 104 in accordance with the operational parameters indicated in the user input.

Figure 5:
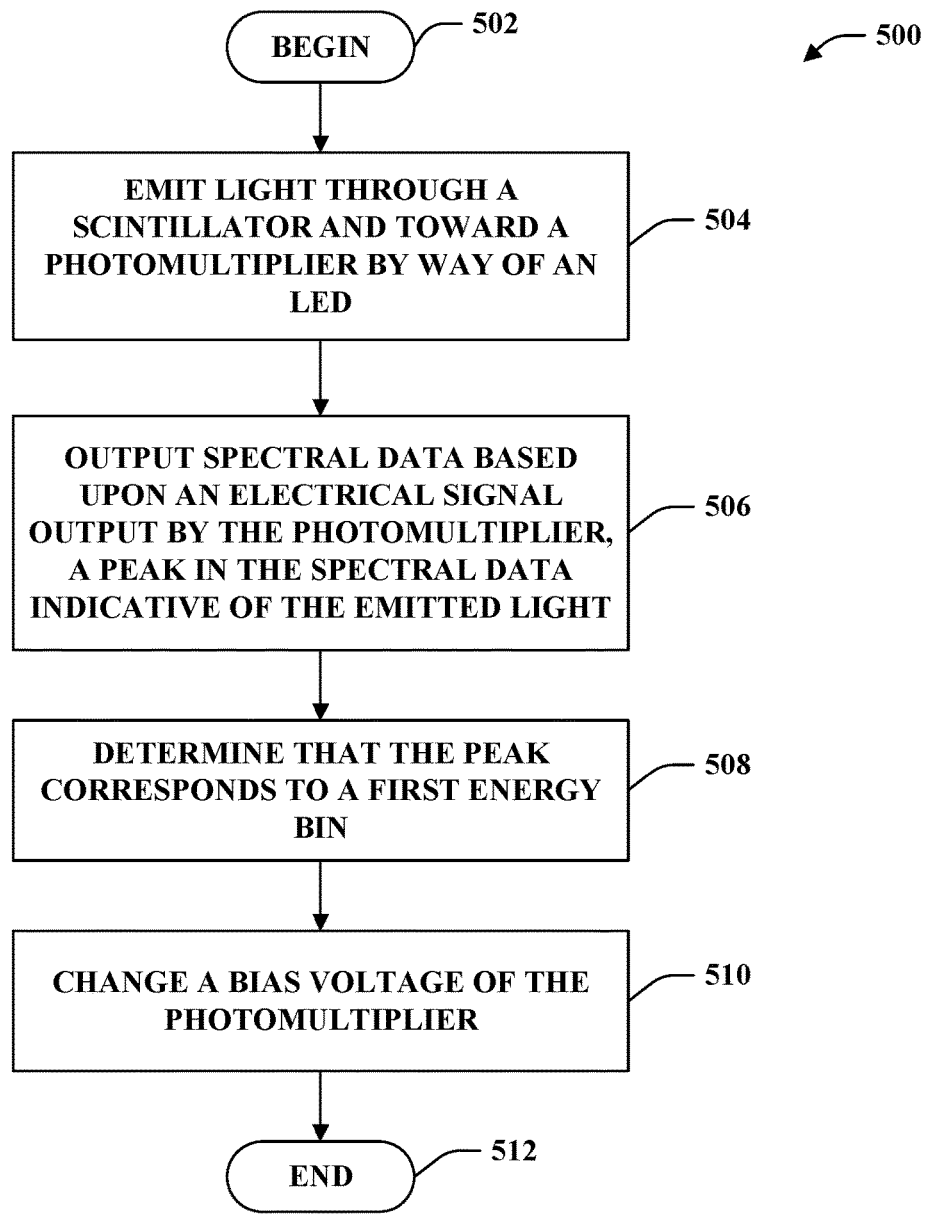
FIG. 5 is a flow diagram illustrating a methodology for in-situ calibration of a radiation spectrometer system.

FIG. 5 illustrates an exemplary methodology relating to in-situ calibration of a radiation spectrometer. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates in-situ calibration of a radiation spectrometer is illustrated. The methodology 500 begins at 502, and at 504, LED light is emitted through a scintillator and toward a photomultiplier by way of an LED. The LED can be configured in similar fashion to any of the LEDs 112, 114, 116 described above. For example, the LED can be configured to emit LED light that is received directly by the photomultiplier, as in the LEDs 114, 116, or the LED can be configured to emit LED light that causes emission of second scintillation light by the scintillator, which second scintillation light is received by the photomultiplier. Responsive to receiving light, the photomultiplier outputs an electrical signal indicative of an apparent energy of the received light. At 506, spectral data is output (e.g., by way of a hardware logic device or a computing system) based upon the electrical signal output by the photomultiplier. The spectral data includes an LED peak that is indicative of the light emitted by the LED. By way of example, and not limitation, the spectral data can comprise a number of counts for each of a plurality of energy bins, the counts indicating a number of periods for which light incident on the photomultiplier had an apparent energy corresponding to their associated energy bin. The LED peak can be a local maximum of the spectral data. It is to be understood that the spectral data can include other peaks, and that the LED peak caused by the LED may not represent a global maximum in the spectral data.

At 508, it is determined that the LED peak caused by the LED light emitted by the LED corresponds to a first energy bin in the spectral data. The LED can be configured and/or controlled such that the LED light emitted by the LED at 504 has an apparent energy that is expected to cause the LED peak to be associated with an expected energy bin. If the first energy bin is the expected energy bin, the radiation spectrometer can be considered to be calibrated appropriately. However, if the first energy bin is offset from the expected energy bin (or an expected range of energy bins), the radiation spectrometer can be calibrated to ensure that in subsequent spectral data, the LED light emitted by the LED causes an LED peak that is positioned at the expected energy bin. For example, at 510, a bias voltage of the photomultiplier is changed. As described above, changing the bias voltage of a photomultiplier can stretch or compress spectral data along the energy bin axis. Thus, at 510, the bias voltage can be changed such that, in subsequent spectral data, the LED light emitted by the LED causes an LED peak that is positioned at the expected energy bin rather than the first energy bin. The methodology 500 completes at 512.

Figure 6:
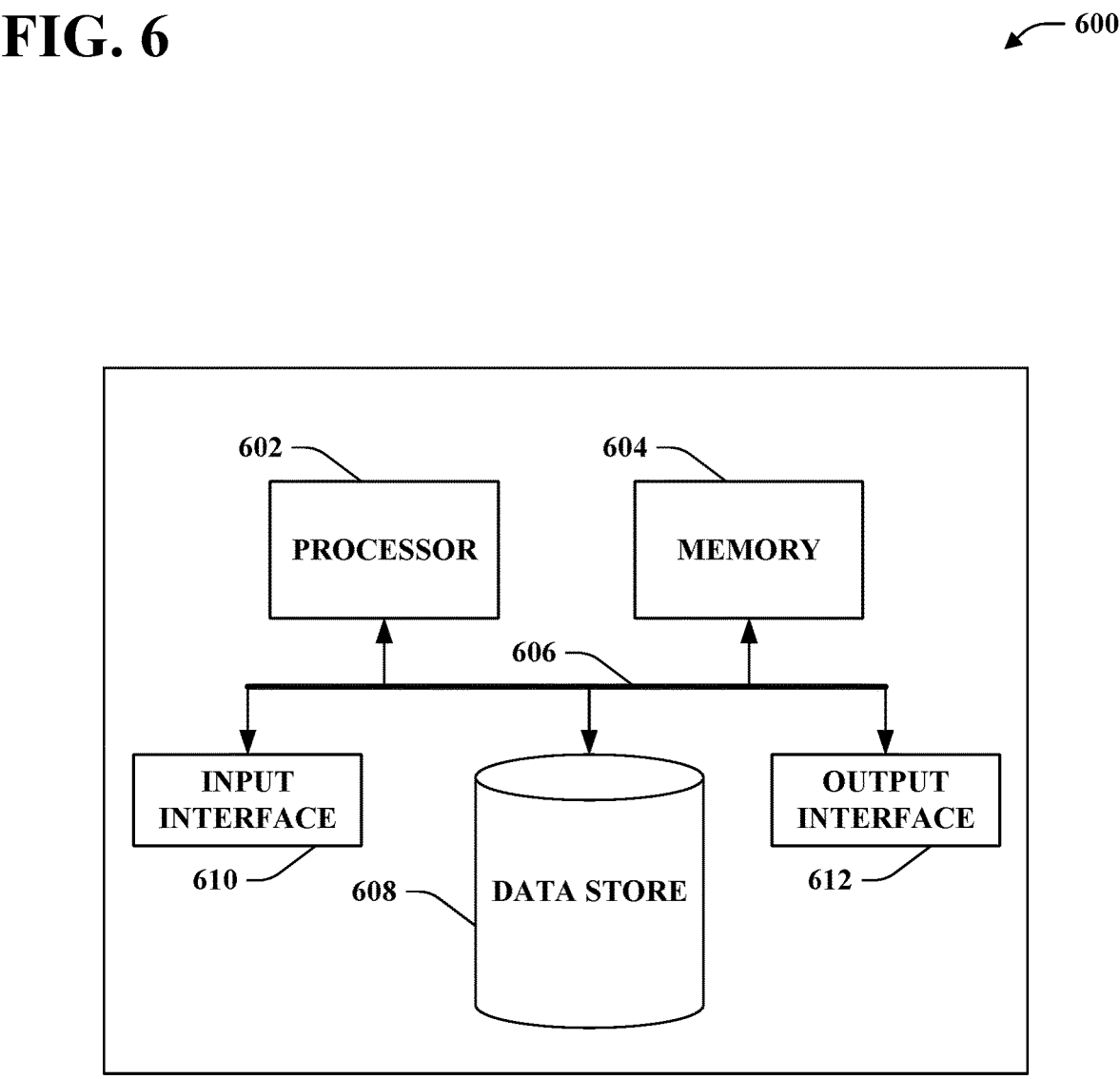
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in the system 400 as the computing system 402. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store spectral data, detection data, control parameters for a radiation spectrometer system, etc.

The computing device 600 additionally includes a data store 608 that is accessible by the processor 602 by way of the system bus 606. The data store 608 may include executable instructions, control parameters, spectral data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc., by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
    a scintillator that emits light responsive to radiation impinging on the scintillator;
    a photomultiplier coupled to the scintillator such that the photomultiplier receives light from the scintillator, the photomultiplier configured to output an electrical signal indicative of light received by the photomultiplier;

a light-emitting diode (LED) that emits LED light toward the scintillator, wherein the scintillator is substantially transparent to the LED light emitted by the LED; and a hardware logic component configured to output spectral data based upon the electrical signal output by the photomultiplier, the spectral data indicative of energies of radiation received at the scintillator over a period of time, wherein the LED light emitted by the LED causes an LED peak in the spectral data, wherein the hardware logic component is configured to output subsequent spectral data based upon a position of the LED peak in the spectral data.

2. The system of claim 1, wherein the LED light emitted by the LED is first light, the first light causes the scintillator to emit second scintillation light, wherein the electrical signal output by the photomultiplier is further indicative of the second scintillation light, and wherein the LED peak in the spectral data is indicative of an energy of the second scintillation light.

3. The system of claim 2, further comprising a second LED that emits third LED light toward the scintillator, and wherein the third LED light causes a second LED peak in the spectral data.

4. The system of claim 3, wherein the third LED light has a wavelength that is within a range of wavelengths of light emitted by the scintillator.

5. The system of claim 3, wherein the scintillator is substantially transparent to the third LED light.

6. The system of claim 3, further comprising a third LED that emits fourth LED light toward the scintillator, and wherein the fourth LED light causes a third LED peak in the spectral data, wherein the first LED light, the third LED light, and the fourth LED light have different wavelengths.

7. The system of claim 1, wherein the LED light emitted by the LED is within a range of wavelengths of light emitted by the scintillator.

8. The system of claim 7, further comprising a second LED that emits second LED light, wherein the scintillator is transparent to the second LED light.

9. The system of claim 1, wherein the photomultiplier is a photomultiplier tube (PMT).

10. The system of claim 1, wherein the photomultiplier is a silicon photomultiplier (SiPM).

11. The system of claim 1, wherein the scintillator includes cesium iodide.

12. The system of claim 1, further comprising an isolation chamber, the scintillator, the photomultiplier, and the LED positioned within the isolation chamber.

13. The system of claim 12, the isolation chamber having a first end and a second end, wherein the photomultiplier is positioned at the first end of the isolation chamber, and wherein the LED is positioned at the second end of the isolation chamber, and wherein further the scintillator is positioned between the photomultiplier and the LED within the isolation chamber.

14. The system of claim 1, wherein the scintillator is configured to emit light responsive to gamma radiation impinging on the scintillator.

15. A method, comprising:

emitting, by way of a light-emitting diode (LED), LED light through a scintillator and toward a photomultiplier, wherein the scintillator is substantially transparent to the LED light emitted by the LED, wherein the scintillator is configured to emit light responsive to radiation impinging on the scintillator, wherein the photomultiplier is configured to receive light from the scintillator and to output an electrical signal indicative of the energy of light received by the photomultiplier; and outputting spectral data based upon the electrical signal output by the photomultiplier, wherein the spectral data includes an LED peak that is indicative of the LED light emitted by the LED.

16. The method of claim 15, further comprising:

responsive to determining that the LED peak corresponds to a first energy bin in the spectral data that is different from an expected energy bin, changing a bias voltage of the photomultiplier such that, subsequent to changing the bias voltage of the photomultiplier, when second light is emitted through the scintillator and toward the photomultiplier by way of the LED, the second light causes a second LED peak in second spectral data to correspond to the expected energy bin.

17. A radiation spectrometer system comprising:

a scintillator that emits light responsive to radiation impinging on the scintillator;

a photomultiplier coupled to the scintillator such that the photomultiplier receives light from the scintillator, the photomultiplier configured to output an electrical signal indicative of light received by the photomultiplier;

a first light-emitting diode (LED) that emits first LED light toward the scintillator, wherein the scintillator is substantially transparent to the first LED light emitted by the first LED;

a second LED that emits second LED light toward the scintillator; and one of a computing device or a hardware logic component configured to output spectral data based upon the electrical signal output by the photomultiplier, the spectral data indicative of radiation received at the scintillator, wherein the first LED light emitted by the first LED causes a first LED peak in the spectral data, wherein the second LED light emitted by the second LED causes a second LED peak in the spectral data, wherein the one of the computing device or the hardware logic device is configured to output subsequent spectral data based upon positions of the first LED peak and the second LED peak in the spectral data.

18. The radiation spectrometer system of claim 17, wherein the first LED and the second LED are configured such that the first LED peak is aligned with a first energy bin in the spectral data and the second LED peak is aligned with a second energy bin in the spectral data.

19. The radiation spectrometer system of claim 18, wherein the first LED light has at least one of a different intensity or a different wavelength than the second LED light.

* * * * *